(12) United States Patent
Friedrichs et al.

(10) Patent No.: US 11,038,915 B1
(45) Date of Patent: Jun. 15, 2021

(54) DYNAMIC GENERATION OF COURSES OF ACTION FOR INCIDENT RESPONSE IN AN INFORMATION TECHNOLOGY ENVIRONMENT

(71) Applicant: Splunk Inc., San Francisco, CA (US)

(72) Inventors: Oliver Friedrichs, Woodside, CA (US); Atif Mahadik, Freemont, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 277 days.

(21) Appl. No.: 16/051,247

(22) Filed: Jul. 31, 2018

(51) Int. Cl.
*H04L 29/06* (2006.01)
*H04L 9/00* (2006.01)
*G06F 21/55* (2013.01)

(52) U.S. Cl.
CPC .......... *H04L 63/1441* (2013.01); *G06F 21/55* (2013.01); *H04L 9/002* (2013.01); *H04L 29/06911* (2013.01); *H04L 63/029* (2013.01); *H04L 63/1491* (2013.01)

(58) Field of Classification Search
CPC ... H04L 63/1441; H04L 63/029; H04L 9/002; H04L 29/06911; H04L 63/1491; G06F 21/55; G06F 2207/7223
USPC .......................................................... 726/23
See application file for complete search history.

(56) References Cited

U.S. PATENT DOCUMENTS

| | | | | |
|---|---|---|---|---|
| 8,522,258 | B1* | 8/2013 | Shaw | G06F 9/542 719/318 |
| 2013/0187873 | A1* | 7/2013 | Jeong | G06F 3/0485 345/173 |
| 2014/0006600 | A1* | 1/2014 | Hong | G06F 9/542 709/224 |
| 2014/0188776 | A1* | 7/2014 | Shuster | G06F 19/3481 706/46 |
| 2016/0103992 | A1* | 4/2016 | Roundy | G06F 21/554 726/23 |
| 2016/0105338 | A1* | 4/2016 | Fletcher | G06F 16/90335 709/224 |
| 2017/0034023 | A1* | 2/2017 | Nickolov | H04L 43/0817 |
| 2017/0048276 | A1* | 2/2017 | Bailey | G06F 3/0482 |
| 2017/0186019 | A1* | 6/2017 | Loeb | G06Q 30/016 |
| 2018/0359199 | A1* | 12/2018 | Nguyen | G06Q 10/107 |
| 2019/0253503 | A1* | 8/2019 | Austin | G06F 16/9558 |

\* cited by examiner

*Primary Examiner* — Tae K Kim
*Assistant Examiner* — Peiliang Pan
(74) *Attorney, Agent, or Firm* — Nicholson De Vos Webster & Elliott LLP

(57) ABSTRACT

Described herein are systems and methods for enhancing an interface for an information technology (IT) environment. In one implementation, an incident service causes display of a first version of a course of action and obtains input indicative of a request for a new action in the course of action. The incident service further determines suggested actions based at least one the input and causes display of the suggested actions. Once displayed, the incident service obtains input indicative of a selection of at least one action from the suggested actions, and causes display input indicative of a selection of at least one action from the suggested actions.

29 Claims, 10 Drawing Sheets

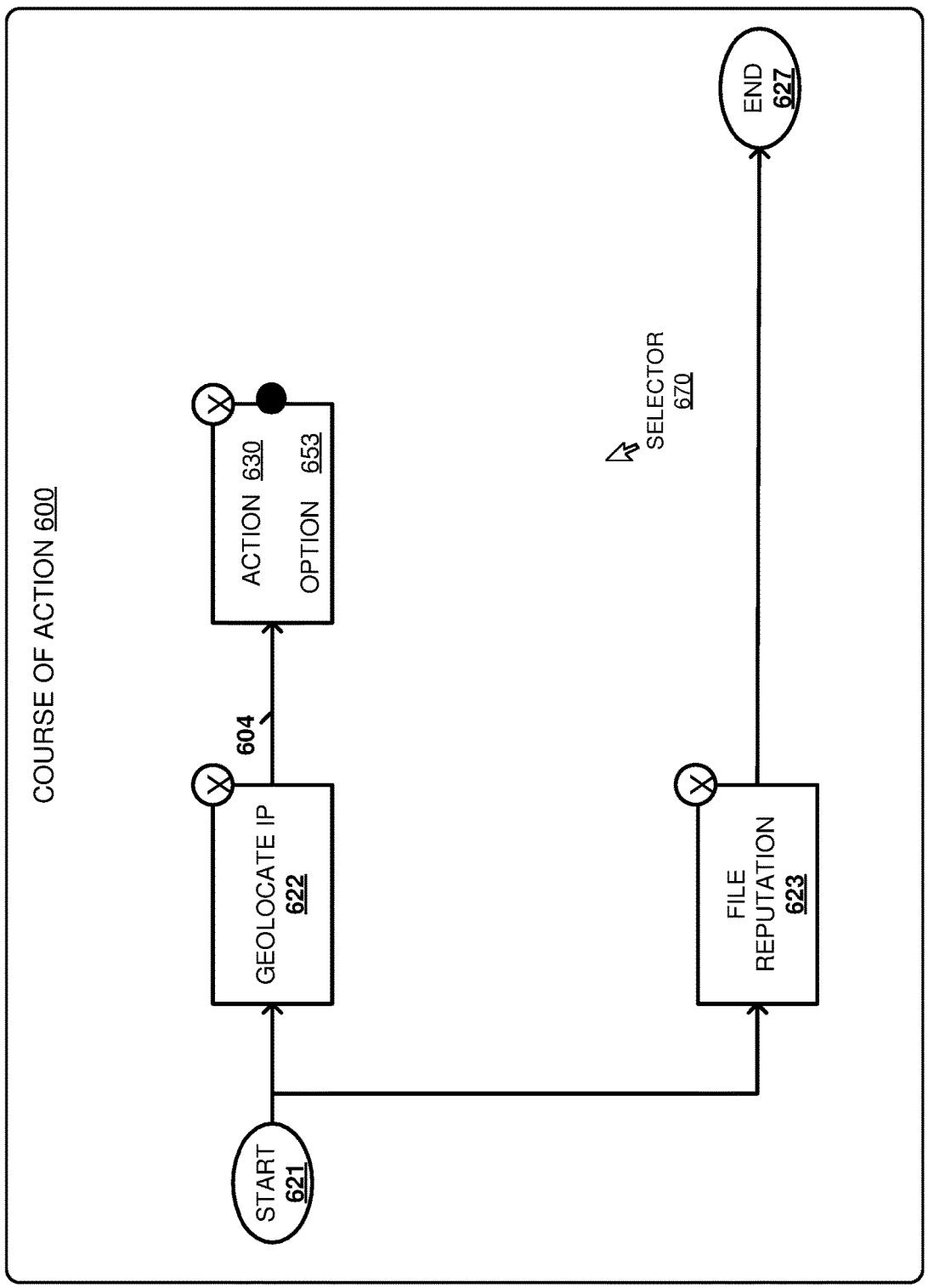

_US 11,038,915 B1_

DYNAMIC GENERATION OF COURSES OF ACTION FOR INCIDENT RESPONSE IN AN INFORMATION TECHNOLOGY ENVIRONMENT

TECHNICAL BACKGROUND

An increasing number of threats exist in the modern computerized society. These threats may include viruses or other malware that attack a local computer of an end user, or sophisticated cyber-attacks to gather data from or otherwise infiltrate a complex information technology (IT) environment. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

IT environments may employ a variety of computing components with different hardware and software configurations to provide the desired operation. These computing components may include end user computing devices, host computing devices, virtual machines, switches, routers, and the like. However, as more computing components are added to an IT environment, those same components become available as targets of potential security threats or incidents. The increasing number computing components in combination with limited administrative personnel and resources can make it difficult to manage the investigation and remediation of potential threats. Even with ample administrators or analyst users, it can be cumbersome to coordinate the investigation and remediation efforts.

OVERVIEW

Described herein are improvements for generating courses of action for an information technology (IT) environment. In one implementation, a method includes causing display of a first version of a course of action, the first version of the course of action comprising one or more actions, and obtaining input indicative of a request for a new action in the course of action. The method further includes determining suggested actions based at least on the input and causing display of the suggested actions. The method also provides obtaining input indicative of a selection of at least one action from the suggested actions and causing display of a second version of the course of action, wherein the second version of the course of action comprises the one or more actions and the at least one selected action.

BRIEF DESCRIPTION OF THE DRAWINGS

FIGS. 6A-6B illustrate an interface for defining a course of action according to an implementation.

DETAILED DESCRIPTION

Figure 1A:
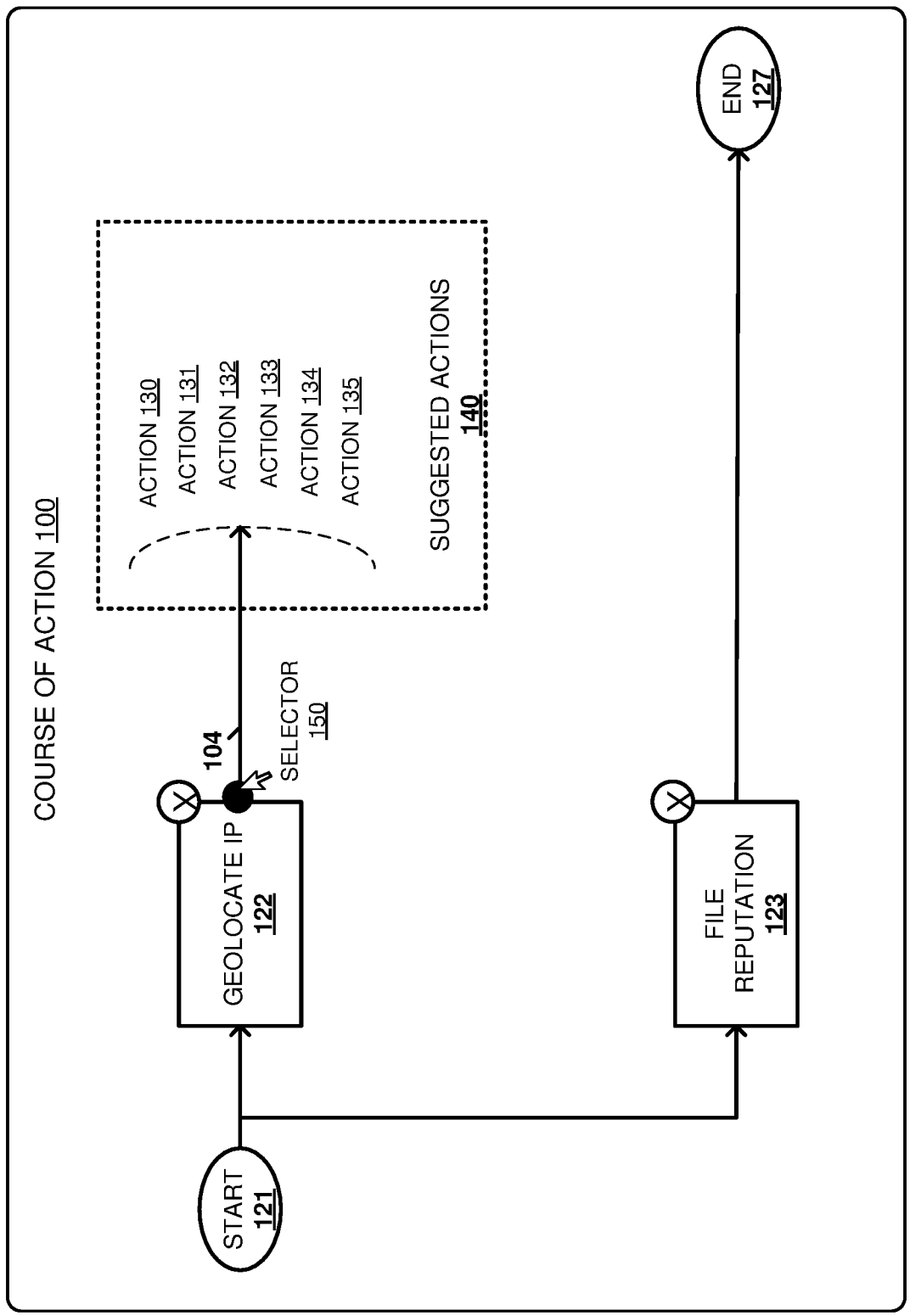
FIGS. 1A and 1B illustrate an interface for defining a course of action according to an implementation.
Figure 1B:
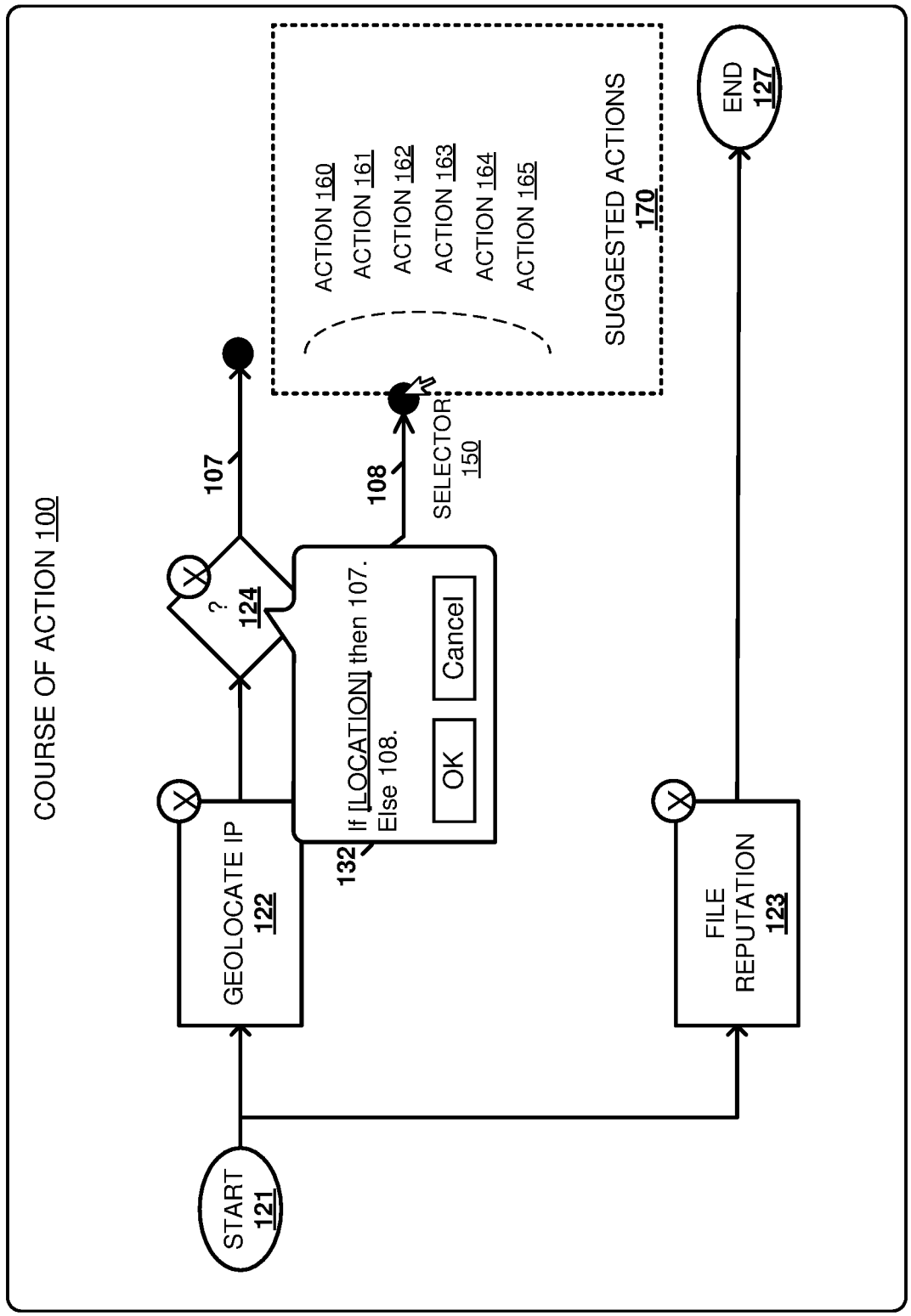

FIGS. 1A and 1B illustrate an interface for defining a course of action according to an implementation. FIG. 1A includes an example course of action 100 that includes start action 121, geolocate internet protocol (IP) action 122, file reputation action 123, and end action 127. FIG. 1A further includes suggested actions 140 with actions 130-135 and selector 150.

In FIG. 1A, an incident service of an information technology (IT) environment may provide a platform that permits analysts associated with the environment to generate and implement courses of action to respond to incidents in the environment. These incidents may include or be associated with viruses, malware, spyware, denial of service attacks, phishing attacks, server crashes, device failures, power outages, or other similar incidents. The course of actions defined by the analysts may comprise one or more actions, wherein the actions may be used to mitigate, monitor, remove, or provide any other similar operations to remediate, correct, or otherwise respond to the incident.

As depicted in FIG. 1A, course of action 100 is depicted as a flow diagram capable of linking or connecting various actions to respond to an incident. In various examples, a course of action can comprise an operational flow of actions to respond to the incident. In the particular example depicted in FIG. 1A, start action 121 is connected to both geolocate IP action 122 and file reputation action 123, wherein an analyst may have manually selected the two actions for responding to a particular type of incident based on professional experience or personal knowledge. In various implementations, actions can be added to the course of action 100. As actions are added to course of action 100, embodiments of the present disclosure can generate suggested action 140 to be added to the operational flow or process of the course of action 100. In some implementations, an analyst may use selector 150, or other graphical user interface (GUI) control element, to indicate a request to link or add an action, in this example geolocate IP action 122, to another action to the flow of actions defined in course of action 100. When selector 150 is selected, a new link 104 and suggested actions 140 may be generated based various factors. For example, suggested actions 140 may be determined based on the type of action corresponding to the preceding action (e.g. geolocate IP), may be determined based on the other actions or sequences of actions that are already defined in course of action 100, or may be determined based on any other information from or associated with course of action 100 or the associated incident or incident type.

In some implementations, in addition to or in place of the information derived from the request, the incident service may also generate suggested actions 140 based on trends identified from previously defined courses of actions. Such courses of actions may be generated by the same analyst, by other analysts of the same IT environment, by analysts in other IT environments, or some other similar trend. The trends may be determined based on the frequency that actions are implemented in a course of action, the frequency that actions are sequenced in a particular order, or some other similar trend. Suggested actions 140 may include actions to determine additional supplemental information for the incident, implement a configuration modification in at least one component of the IT environment, compare previously obtained information for the incident against criteria or thresholds, decision or split actions, ending the course of action, or providing any other similar type of action in the course of action.

Turning to FIG. 1B, once the analyst selects an action from actions 130-135, a new action may appear, represented as a box in the flow diagram, in course of action 100. Here, decision action 124 is generated and is used as a decision action to split the path in the course of action 100. In this particular example, decision action 124 and function 132 determines whether the location information derived from geolocate IP action 122 corresponds to a particular location, and if the location information does correspond to the particular location then course of action 100 follows path 107. When the location information does not correspond to the particular location, then decision action 124 causes course of action 100 to follow path 108. Once the new action is added to course of action 100, the analyst generating the course of action may again select new actions to link to the any other action in the course of action 100. Thus, when the analyst selects an option to add an action to path 108, the analyst may be provided with suggested actions 170 and actions 160-165, wherein actions 160-165 may comprise different actions than those provided in suggested actions 140 of FIG. 1A, and wherein suggested actions 170 may be identified in a similar manner to that of suggested actions 140.

Figure 2:
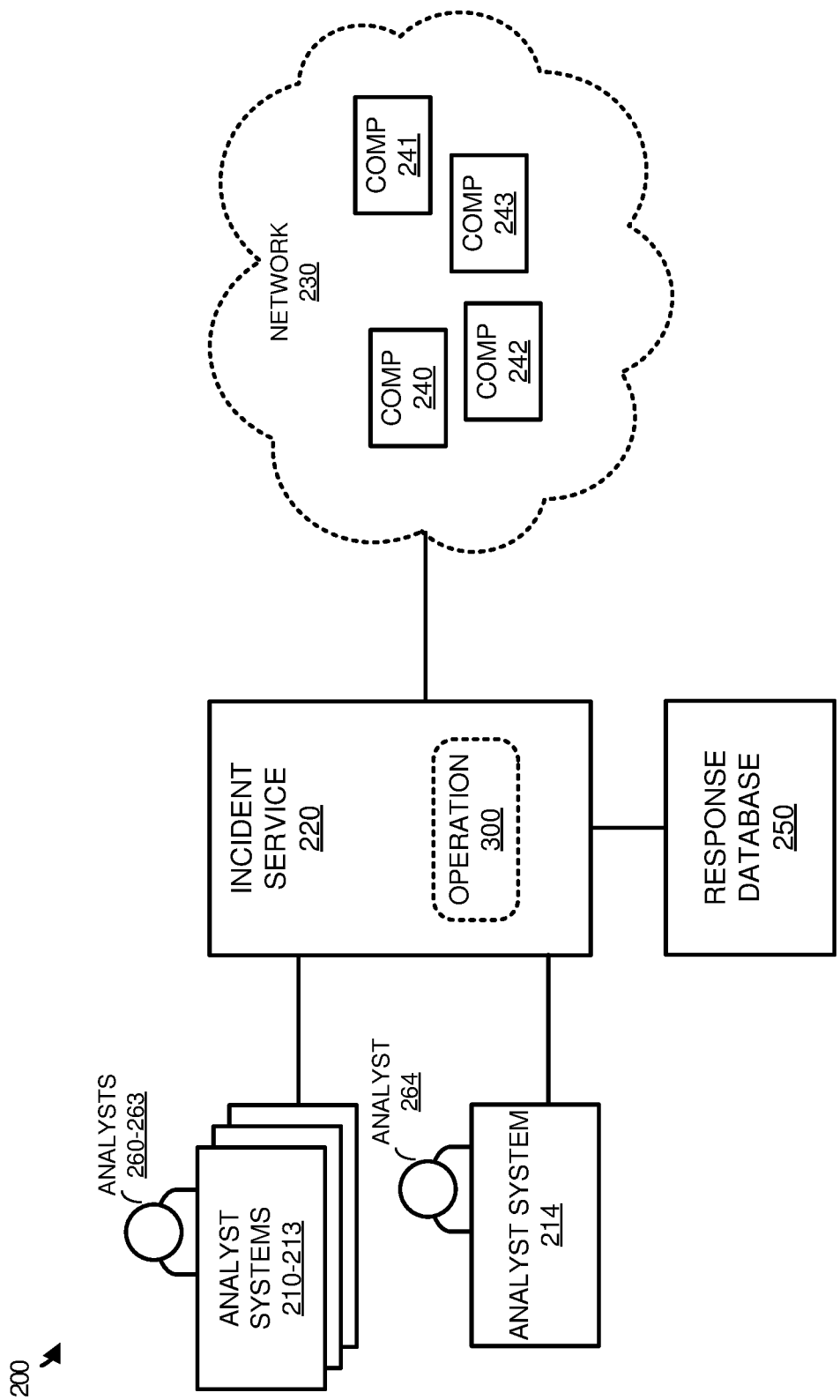
FIG. 2 illustrates an information technology (IT) environment according to an implementation.

FIG. 2 illustrates an IT environment 200 according to an implementation. IT environment 200 includes analyst systems 210-214, analysts 260-263, incident service 220, network 230, and response database 250. Network 230 further includes components 240-243 wherein components 240-243 may comprise physical computing systems, virtual computing systems, routers, switches, firewalls, or some other similar types of computing elements, including combinations thereof. Incident service 220 further provides operation 300 described in FIG. 3.

In operation, incident service 220 provides a platform that permits analysts 260-264 to respond to incidents that occur in the IT environment. To respond to the incidents, incident service 220 may manage courses of action that each include one or more actions to respond to various incident types. For example, a power outage may correspond to a first course of action, while a second course of action may correspond to an unknown process executing on a component of network 230. In generating the courses of action, incident service 220 may provide or generate an interface that permits analysts via analyst systems 210-214 to indicate a flow diagram of actions desired to respond to a particular incident. For example, a course of action may be generated by analyst 264 that, when an unknown communication is identified for a component of network 130, incident service should determine a geolocation of the source of the communication and configure a firewall based on whether communication originated from a particular geolocation. Thus, a first action in the course of action may determine the geolocation of the communication, a second action may determine whether the location meets criteria, and a third action may configure a firewall when the location meets the criteria.

Figure 3:
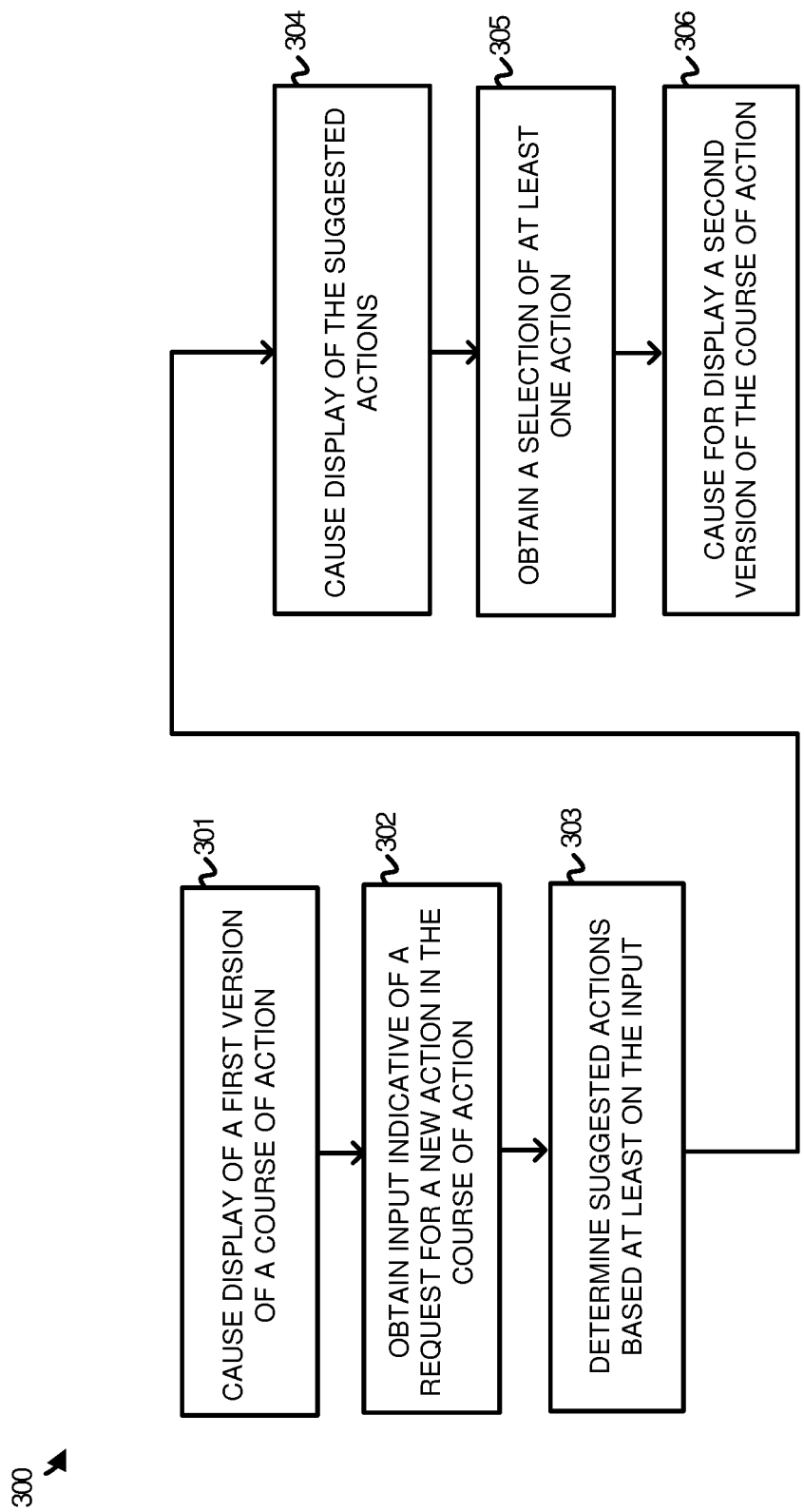
FIG. 3 illustrates an operation of an incident service according to an implementation.

Here, to assist analysts 260-264 in generating the courses of action, incident service 220 may provide suggestions to an analyst indicating actions that could follow another action in the course of action. These suggestions may be based on the action that supersedes the new action, may be based on the action that follows the new action, may be based on other actions implemented in the course of action, may be based on trends from other courses of action of IT environment 100, may be based on trends from other courses of action in other IT environments, or may be based on any other similar factor. In at least one implementation, incident service 220 may access response database 250, wherein response database 250 may store information related to recommending actions for analysts 260-264 during development of a particular course of action. The information may include sequencing information for which actions follow other actions, and may comprise explicit rules (e.g. rule A should always be suggested to follow rule B), may comprise information about other courses of action implemented in the environment, or may comprise information about other courses of action implemented FIG. 3 illustrates an operation 300 of an incident service according to an implementation. The functions of operation 300 are described parenthetically in the paragraphs that follow with reference to systems and elements of IT environment 200 of FIG. 3, as well as course of action 100 of FIGS. 1A-1B.

As depicted, operation 300 includes causing (301) display of a first version of a course of action, wherein the course of action comprises one or more actions. This first version of the course of action may comprise a flow, depicted as a graph, chart, diagram, text or combination thereof, that provides sequencing information for the one or more actions in the course of action. Referring to an example from IT environment 200, analyst 264 may make, to the incident service 220 using a corresponding analyst system 214, a request to implement a new course of action and indicate one or more actions to be defined as part of the course of action. In one example embodiment, the analyst may define a type of incident for which the course of action is to be used, and indicate an initial action to be performed as part of the course of action. Once the request or requests for the course of action are identified from analyst 264, incident service 220 may cause display of the first version of the course of action.

After causing display of the first version of the course of action, operation 300 obtains (302) input indicative of a request for a new action in the course of action. In at least one implementation, the input may comprise a request to add a subsequent action to the flow diagram following a preexisting action. As an example, a first action may determine a geolocation associated with an IP address for an incident, and the user may desire to perform a subsequent action that uses the information from the geolocation action. The input may be provided via a mouse, a touch display, or some other similar interface, and may be provided via the selection of an icon, button, an action block in the course of action, or some other similar object in the course of action interface. Referring to an example in course of action 100 of FIG. 1A, the user selects an icon as part of geolocate IP action 122 to trigger the request of a new action for the course of action.

After obtaining the input, operation 300 determines (303) suggested actions based at least in part on the input and causes (304) display of the suggested actions. In some implementations, incident service 220 may identify that the input indicates a request to add a subsequent action to an action previously added to the course of action. This request may be identified based on the icon or object selected by the analyst, may be determined based on information provided in the request from the analyst, or may be based in any other information. Referring to the example in course of action 100 of FIG. 1A, an analyst may select an icon on the edge of an action (geolocate IP action 122) in the flow diagram of course of action 100 to request a new action in the course of action. From the selection, the incident service may determine which preexisting action in the course of action will flow or continue to the new action and determine action suggestions based at least on the preexisting action. For example, if a request is for a new action in a course of action following a file reputation determination action, then the action suggestions may be determined based on the information obtained from the file reputation determination action. In particular, actions suggestions may be determined based on actions that can use the file reputation information (e.g. block IP actions based on the reputation of the file), and may further be determined based on the format of the data returned as part of the file reputation determination. For example, actions may be identified based on actions that can use the format of the score or value returned as part of the file reputation determination action. In some instances, the suggested actions may be determined based on attributes or parameters that were identified from the incident (e.g. domain names, IP addresses, and the like), wherein actions that perform operations using the attributes or parameters may be prioritized or promoted over other types of actions. Additionally, incident service 220 may consider the parameters that are returned from other actions in promoting new actions for the course of action. Referring to the example of the file reputation action, actions capable of using the returned parameter from the file reputation action may be promoted over other types of actions.

In other implementations, in addition to or in place of using information about the previous actions, incident service 220 may further consider any other actions that are currently implemented in the course of action, trends from other courses of action developed for the IT environment, trends from other courses of actions in other IT environments, or some other similar factor. As an example, when a request is generated to add a new action to follow an existing action, incident service 220 may determine trends in actions that follow the existing action from other courses of action for the IT environment. From these trends, and any other information from the current version of the course of action, incident service 220 may determine action suggestions to support the request.

In at least one implementation, incident service may generate a hierarchy of the action suggestions based on the aforementioned factors, wherein suggestions may be promoted or demoted based on the trends from the other courses of action, as well as actions in the current course of action. Once the hierarchy is generated, the suggested actions may be displayed in accordance with the hierarchy, wherein actions may be promoted in a list based on the hierarchy, presented in a different font or font size, highlighted, or presented in some other similar manner to display suggestions in accordance with the hierarchy.

After causing the display of the action suggestions, operation 300 obtains (305) a selection of at least one action and causes (306) for display a second version of the course of action, wherein the second version includes the newly selected action. Referring to the example in FIGS. 1A and 1B, an analyst may provide input selecting an action from suggested actions 130-135. In response to the selection, the incident service may update course of action 100 such that it includes the new action coupled to geolocate IP action 122. As demonstrated in FIG. 1B, the second version of the course of action includes action 124, wherein action 124 corresponds to the selection of the analyst. Once an action is added to the course of action, it should be understood that the processes of operation 300 may be repeated as necessary to complete a course of action.

Figure 4:
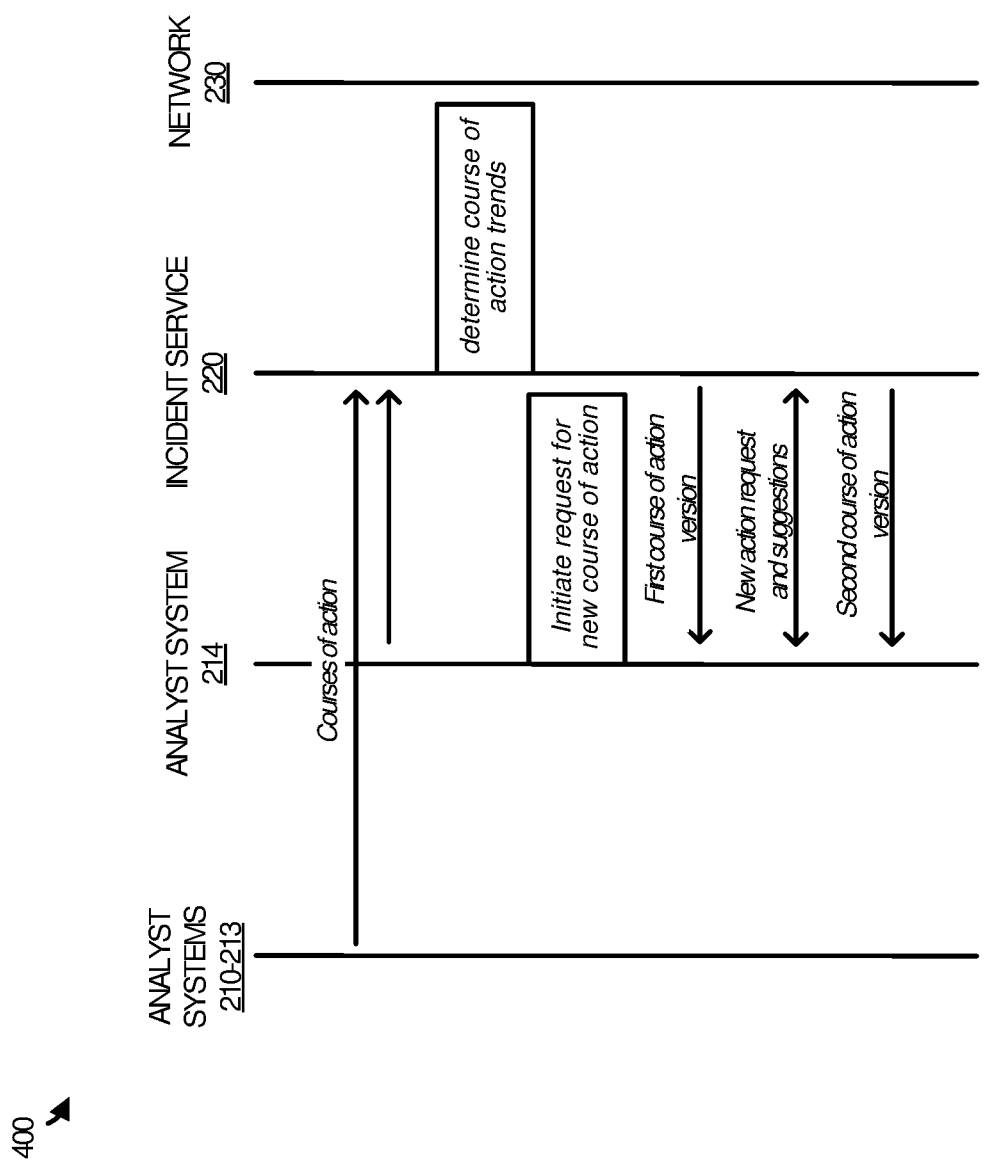
FIG. 4 illustrates a timing diagram for determining and maintaining course of action trends according to an implementation.

FIG. 4 illustrates a timing diagram 400 for determining and maintaining course of action trends according to an implementation. Timing diagram 400 includes systems and elements of IT environment 200 of FIG. 2.

In operation incident service 220 may obtain courses of action from analyst systems 210-214, wherein the courses of action each include one or more actions to respond to various incidents in network 230. In defining each course of action, an analyst may generate a flow diagram providing sequencing information for the various actions associated with the particular course of action, and may further indicate the types of incidents that are related to the particular course of actions. Accordingly, while a first course of action may be generated to respond to an incident of a first incident type, a second course of action may be generated to respond to an incident of a second incident type. The courses of action generated by analysts of IT environment 200 may be generated in response to an incident being identified in at least one component of network 230 or may be generated in anticipation of an incident.

Once the courses of action are identified from the analyst systems, incident service 220 further determines course of action trends based on the actions implemented in the courses of action. These trends may be based on the frequency that actions are coupled or placed in a particular order, based on the overall actions included in the courses of action, or based on any other similar information derived from the courses of action.

As the trend information is maintained by incident service 220, an analyst via analyst system 214 may initiate a request for a new course of action. This request for a new course of action may occur in response to an incident being identified in network 230 or may be initiated preemptively for an incident in network 230. Once the request is identified, incident service 220 may cause display of an interface capable of defining a flow diagram of actions to provide the desired course of action.

In at least one implementation, incident service 220 may cause of display at analyst system 214 a first version of a course of action, wherein the first version may include one or more actions. These actions may include actions to identify supplemental information about an incident (geolocation, file reputation, domain reputation, and the like), may comprise decision actions, may comprise actions to start or stop the course of action, may comprise actions to provide modifications to one or more components of the IT environment, or may comprise any other similar operation. After providing the first version of the course of action, incident service 220 may identify an action request to add a new action to the course of action. This request may be generated by selecting a currently implemented action for which to link to a new action, may be generated by selecting an icon or button to trigger the addition of a new action, or may be generated in any other similar manner. In response to the request, incident service 220 may determine and cause display of action suggestions to support the request, wherein the action suggestion may be determined at least in part on the course of action trends determined from previously generated courses of actions in the IT environment. In some implementations, in addition to the trends, incident service may further determine action suggestions based on the other actions that are implemented in the first course of action, trends from other IT environments (such as other organizations or entities), or from any other similar source.

In some examples, incident service 220 may determine suggested actions based on comparing available actions to criteria. For example, various actions may be allocated a score based on the relevance of the action in relation to the incident type for the course of action, the relevance of the action in relation to other actions implemented in the course of action, the trends of actions from the previously generated courses of actions, or some other similar factor. Once the scores are determined, actions that meet or satisfy a criteria score may be provided as the suggested actions. In some implementations, in providing the action suggestions, incident service 220 may generate a hierarchy for various actions, wherein the hierarchy may be determined based on similar factors to those described above including, the trends in the actions, the current actions in the course of action, or some other similar factor. Once the hierarchy is generated, the hierarchy may be provided as a list, may promote actions over other actions using font style, size, or highlighting, or may promote actions in some other similar manner.

Returning to the elements of FIG. 2, analyst systems 210-214, incident service 220, and response database 250 may each comprise communication interfaces, network interfaces, processing systems, computer systems, microprocessors, storage systems, storage media, or some other processing devices or software systems, and can be distributed among multiple devices. Examples of analyst systems analyst systems 210-214, incident service 220, and response database 250 can include software such as an operating system, logs, databases, utilities, drivers, networking software, and other software stored on a computer-readable medium. Analyst systems analyst systems 210-214, incident service 220, and response database 250 may comprise, in some examples, one or more server computing systems, desktop computing systems, laptop computing systems, or any other computing system, including combinations thereof.

Network 230 includes computing components 240-243, which may include physical computing systems (host computing systems, user devices, and the like), virtual computing systems, such as virtual machines and containers, routers, switches, and other similar computing systems.

Figure 5:
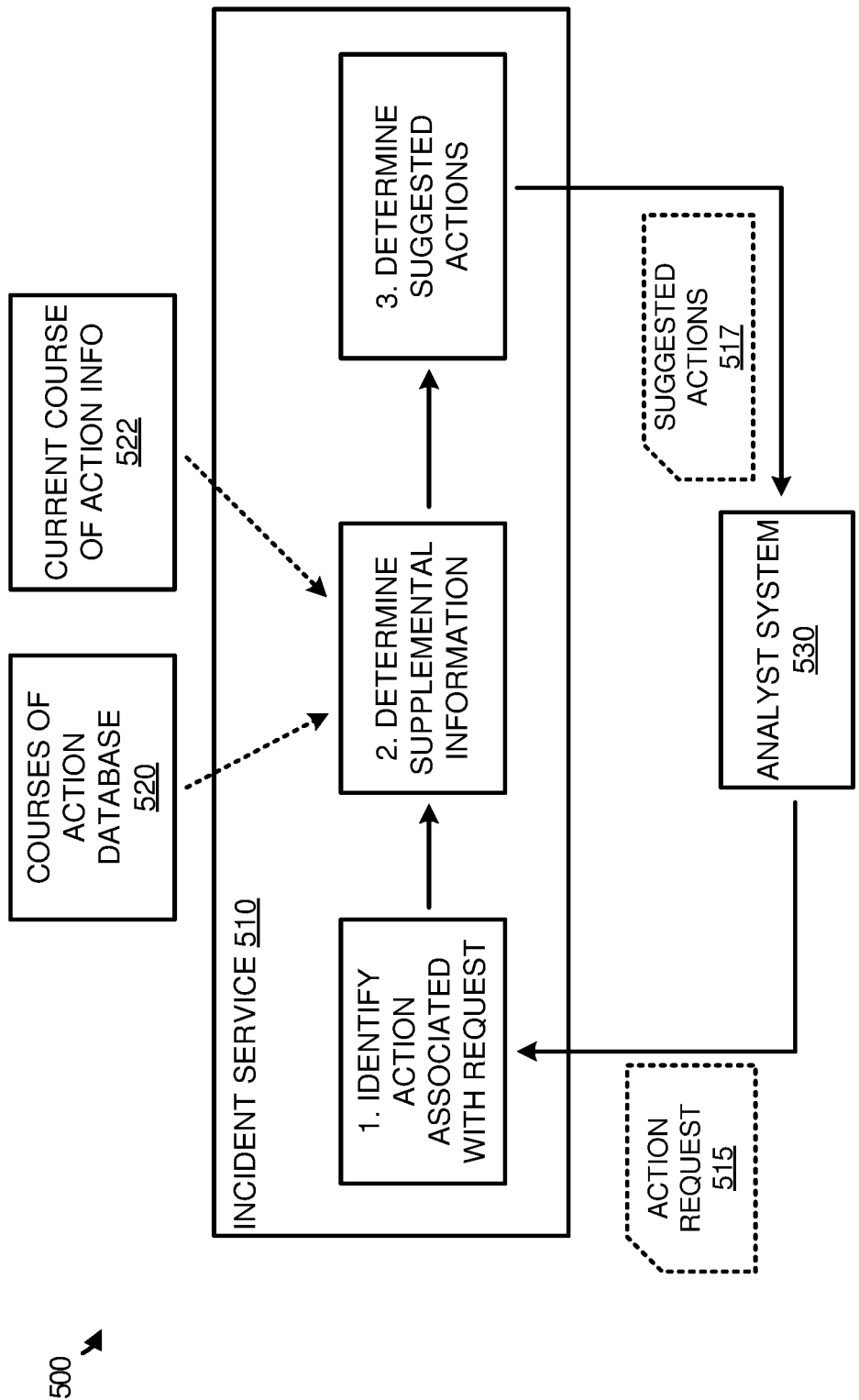
FIG. 5 illustrates an operational scenario of providing suggested actions according to an implementation.

Communication between analyst systems 210-214, incident service 220, response database 250, and components within network 130 may use metal, glass, optical, air, space, or some other material as the transport media. Communication between analyst systems 210-214, incident service 220, response database 250, and components within network 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 210-214, incident service 220, response database 250, and components within network 130 may use direct links or can include intermediate networks, systems, or devices, and can include a logical network link transported over multiple physical links FIG. 5 illustrates an operational scenario 500 of providing suggested actions according to an implementation. Operational scenario 500 includes incident service 510, action request 515, suggested actions 517, courses of action database 520, and current course of action information 522.

In operational scenario 500, incident service 510 obtains and identifies, at step 1, action request 515 from analyst system 530 to add a new action to a course of action, the course capable of responding to incident in an IT environment. In response to the request, incident service 510 determines, at step 2, supplemental information related to the request that can be used in determining suggested actions to support the request. The supplemental information may include information from courses of action database 520 and/or current course of action information 522. In particular, courses of action database 520 may include information about other course of action that have been implemented in the same or different IT environments, wherein the information may indicate information about trends in action sequencing from other courses of action, quantities that particular actions have been implemented, frequently used actions or sequences of actions used against particular incident types, or some other similar information. In addition to, or in place of the information from other courses of action database 520, incident service 510 may use current course of action information 522 related to the current course of action. In some implementations, current course of action information 522 may provide information about preceding or subsequent actions to the requested action, information about the type of incident for the course of action, information about the various actions in the course of action, or some other similar information.

Once the supplemental information is identified for the request, incident service 510 may determine, at step 3, suggested actions 517 to be provided to the analyst based on the supplemental information. Additionally, the supplemental information may be used to prioritize or otherwise indicate a hierarchy of the action suggestions, such that an action that is identified as most relevant may be promoted over other suggestions in suggested actions 517. Once suggested actions 517 are generated and displayed at analyst system 530, the analyst may select the desired action to be added to the course of action.

Figure 6A:
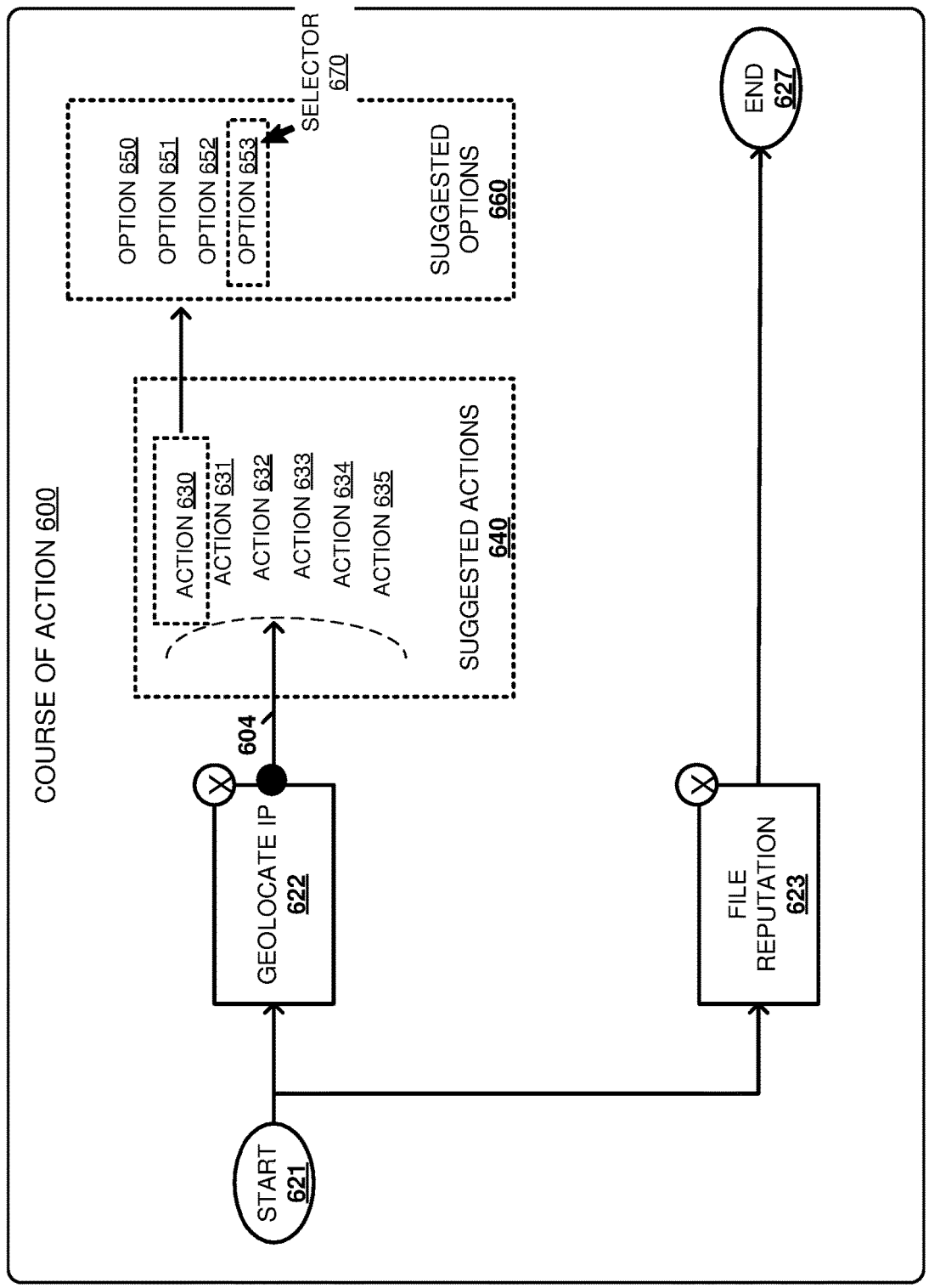

FIGS. 6A-6B illustrate an interface for defining a course of action according to an implementation. FIGS. 6A-6B include course of action 600 with start action 621, geolocate IP action 622, file reputation action 623, and end action 627. FIG. 6A further includes suggested actions 640 with actions 630-635 coupled to geolocate IP action 622 through link 604, and suggested options 660 with options 650-653. FIG. 6B further includes selected action 630 with option 653.

Referring to FIG. 6A, an incident service may cause display of an interface that provides a platform for analysts to generate courses of actions to respond to various incidents. Here, a first version of course of action 600 is provided wherein start action 621 continues to geolocate IP action 622 and file reputation action 623. Once file reputation action 623 completes, the course of action continues to end action 627, while the path associated with the geolocate IP action 622 remains incomplete. In the present implementation, a request is generated to add a new action subsequent to geolocate IP 622. In response to the request, the incident service determines suggested actions 640 as described herein and further determines suggested options 660, wherein the options may comprise different services (such as external databases and websites) to support the action, different versions of a particular action, or some other similar type of option. For example, an action to determine a reputation of an IP address may be capable of using a variety of services, which can provide the information in the same or different formats. As a result, various options may be provided to the analyst indicating the various options for the action. In some implementations, the options may be determined based on components and/or services that are available to the analyst or the IT environment. For instance, a first analyst may be allocated permission to implement particular options, while a second analyst for the same IT environment may be allocated permission to implement different options. Similarly, an IT environment may only subscribe to a subset of available services resulting in the IT environment being allocated one set of options, while a different IT environment may be provided with a different set of options. Additionally, similar to how the action suggestions may be prioritized or placed in a hierarchy, options may be promoted or placed in a hierarchy based on actions in the current course of action (e.g. actions that require a particular data format), or based on trends from other courses of action.

Turning to FIG. 6B, because an analyst selected action 630 with option 653, the incident service may add the corresponding action to the current course of action 600, resulting in an updated version of the course of action that can be displayed for the analyst. Once added, additional actions may be added to the course of action by the analyst to provide the desired operations.

In some implementations, each action in course of action 600 corresponds to instructions in one or more programming languages, scripts, or other similar languages capable of providing the required functions for the actions. These languages may be capable of interacting with components with different hardware and software configurations, services with different format requirements, or some other communication and configuration requirement.

Figure 7:
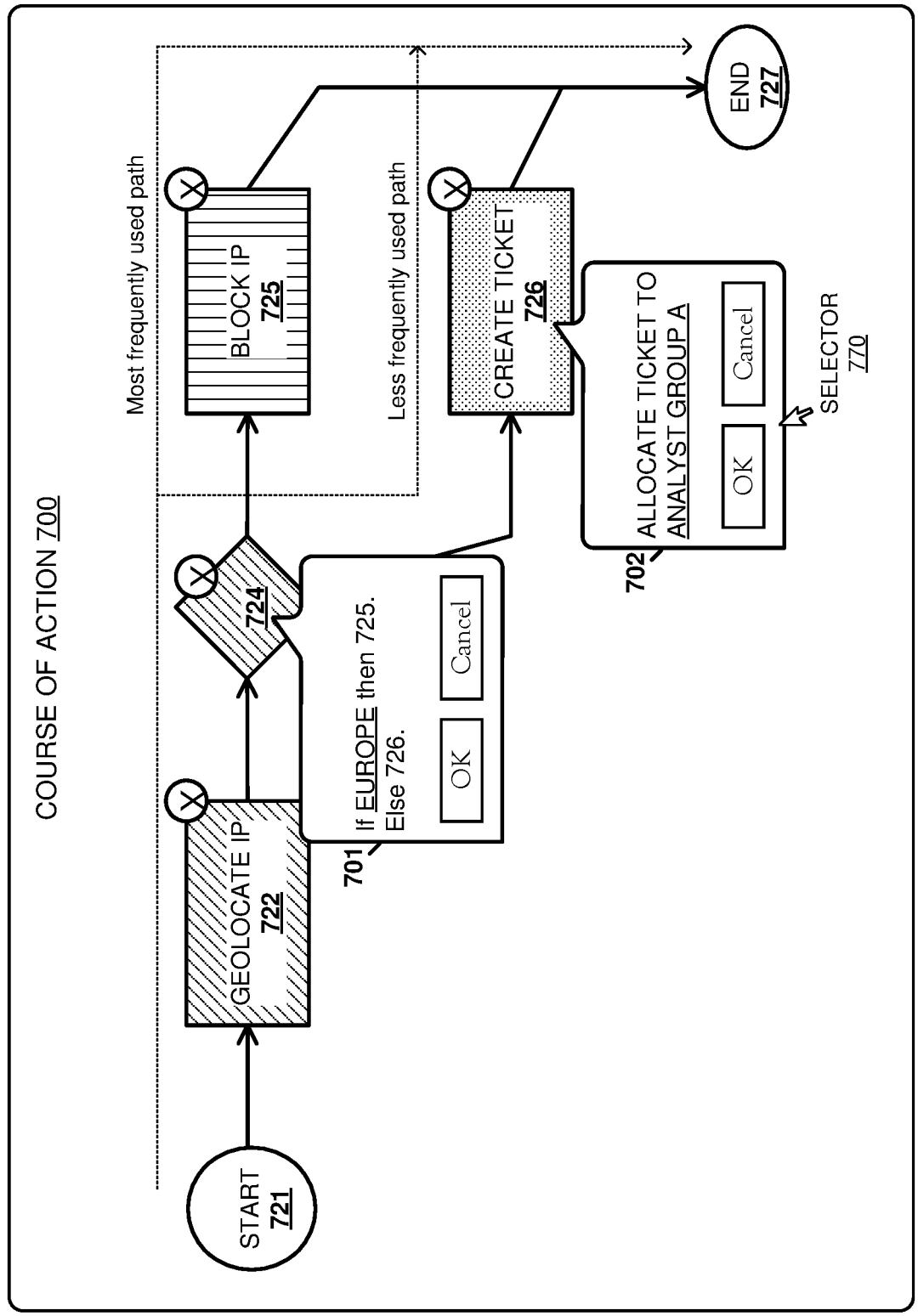
FIG. 7 illustrates an interface indicative of frequently used paths in a course of action according to an implementation.

FIG. 7 illustrates an interface indicative of frequently used paths in a course of action according to an implementation. The interface of FIG. 7 includes course of action 700, wherein course of action 700 further includes actions for start action 721, geolocate IP action 722, decision action 724, block IP action 725, create ticket action 726, and end action 727. Decision action 724 further includes operation 701 to determine the source of an action and create ticket action 726 further includes operation 702 to allocate incidents to particular analysts.

As described herein, an incident service may be used as a platform to generate and implement courses of actions to various incidents within an IT environment. Once a course of action is generated, analysts within the environment may desire to monitor how incidents are processed by each of the courses of action. In particular, analysts may desire to monitor the quantity of incidents that are responded to using the course of action, the various paths that are used in each course of action, the quantity or frequency that each of the paths are used, or some other information about the course of action. In the example of course of action 700, an incident service may generate an interface that demonstrates a frequency or "heat map" that the actions in course of action 700 are used when the course of action is deployed. In one implementation, the incident service may monitor incident responses implemented in the IT environment. In monitoring the incident responses, the incident service may determine which courses of action are implemented, the path or paths that are used within the courses of action for each of the incident responses, or some other similar information about the incident responses.

As the information is monitored, an analyst may request the incident service, or the incident service may provide as part of a notification, an interface that demonstrates information about course of action 700. For example, an analyst may desire information about course of action 700 prior to implementing an incident response using course of action 700. In response to the request, the incident service may cause display of course of action 700 with indications for the frequency that each of the actions are used in responding to previous incidents. Here, the most frequently used path includes geolocate IP action 722, decision action 724, block IP action 725, and end action 727, while create ticket action 726 is used less frequently. The display of course of action 700 may include shading, colors, numerical values, or some other similar information to indicate the frequency that each of the actions are used as part of the course of action. This information may permit analysts to identify actions that are not being used as desired, trends in the incident identified in the environment, or some other similar information for the course of action. Further, in some example, the information provided in the interface may provide suggestions for decision operations based on the frequency that actions are executed. Accordingly, if an action in the plurality of actions were not being used, the suggestions may identify a value that would increase the use of the action and provide the value in the interface.

In at least one implementation, an operation for the incident service may monitor implementations of course of action 700 in the IT environment, wherein the monitoring may determine the frequency or quantity that each of the actions are used when the course of action is deployed. As the information is maintained, the incident service may identify a request to generate a display of the course of action. In response to the request, the incident service may generate a flow diagram, such as that depicted in FIG. 7, that indicates a frequency or quantity that each of the actions were implemented as part of the course of action.

Figure 8:
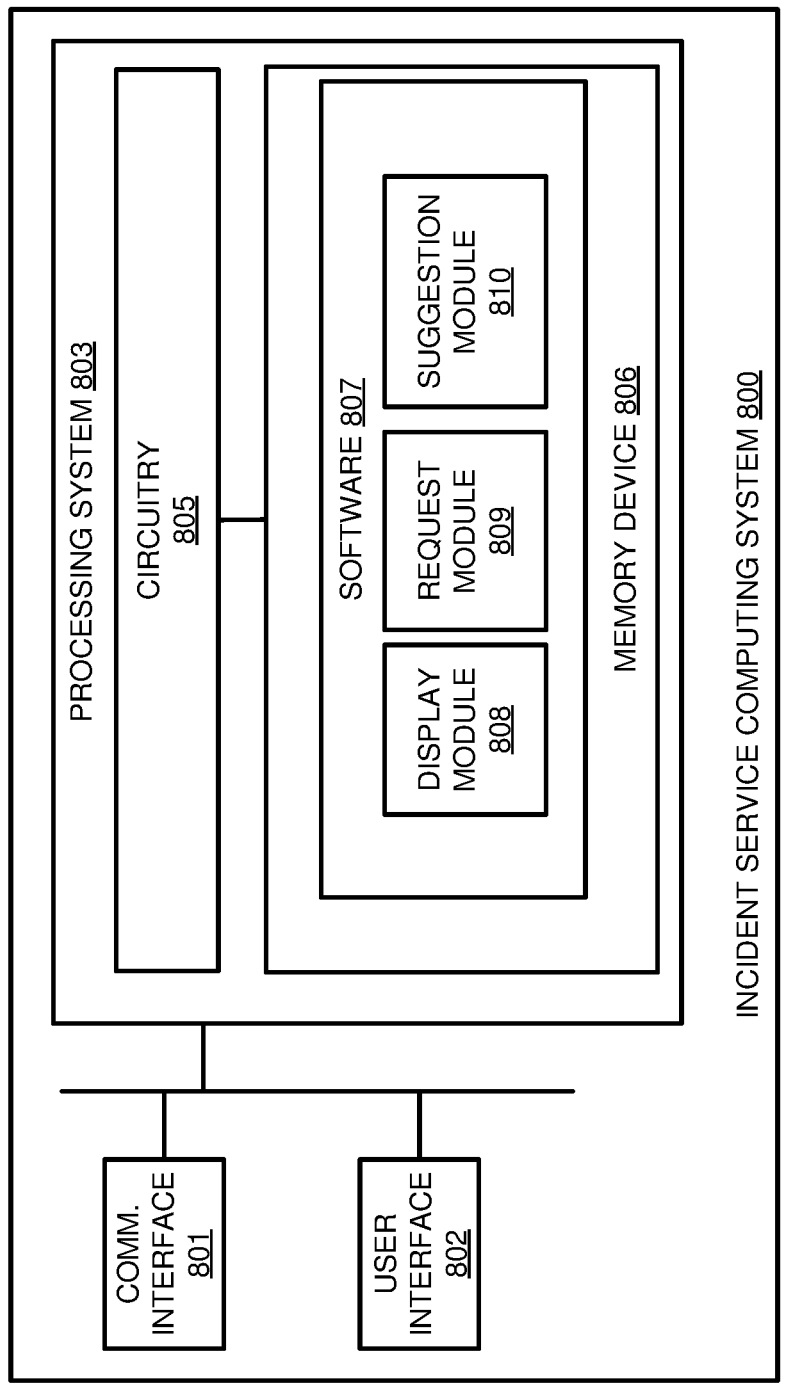
FIG. 8 illustrates an incident service computing system according to an implementation.

FIG. 8 illustrates an incident service computing system according to an implementation. Computing system 800 is representative of any computing system or systems with which the various operational architectures, processes, scenarios, and sequences disclosed herein for an incident service may be implemented. Computing system 800 is an example of incident service 220, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate analyst consoles or systems as well as computing components within an IT environment. In some implementations communication interface 801 may further communicate with databases or other services that maintain information about courses of action for the IT environment.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes display module 808, request module 809, and suggestion module 810, although any number of software modules may provide a similar operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, display module 808 directs processing system 803 to cause for display a first version of a course of action. Once displayed, request module 809 may identify a request to add an action to the course of action. In response to the request, suggestion module 810 may direct processing system 803 to determine action suggestions based on the request and cause display of the suggestions for an analyst that generated the request. The suggestions may be based on the precedent or subsequent action to the new action, may be based on the other actions in the course of action, may be based on trends from other courses of action, or may be based on any other similar action information. Once displayed, request module 809 may identify a request for an action from the suggested actions, and display module 808 may cause display of a second version of the course of action that includes the desired action.

As an example, a first version of a course of action may comprise an action to identify the geolocation of an IP address associated with the incident (e.g. the source of the communication generating the incident). Accordingly, the action suggestions provided by computing system 800 may include suggestions for providing operations to process the geolocation, such as processing the communication in a first manner when the geolocation corresponds to a first location, as opposed to when the geolocation corresponds to a second location. Once the suggestions are identified, the suggestions may be provided to the requesting analyst, wherein the analyst may select a suggestion causing the new action to be added as part of a second version of the course of action.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   causing display of a first version of a course of action comprising a plurality of actions used to respond to occurrences of incidents in an information technology (IT) environment, wherein the IT environment comprises a plurality of computing devices and the course of action defines an operational flow of the plurality of actions;
   obtaining input requesting addition of a new action in the course of action, wherein the new action is linked to at least one of the plurality of actions;
   determining suggested actions based at least in part on the plurality of actions, wherein determining the suggested actions includes determining a relevance of each of the suggested actions to the plurality of actions of the course of action;
   causing display of the suggested actions;
   obtaining input selecting a particular action from the suggested actions; and
   causing display of a second version of the course of action, wherein the second version of the course of action includes the plurality of actions of the first version of the course of action and the particular action.

2. The method of claim 1, wherein the course of action comprises a flow diagram indicative of the operational flow of the plurality of actions.

3. The method of claim 1, wherein the course of action comprises a flow diagram indicative of the operational flow of the plurality of actions, and wherein obtaining the input requesting addition of the new action in the course of action comprises obtaining input requesting to link the new action to the at least one of the plurality of actions in the operational flow.

4. The method of claim 1, wherein the plurality of actions include an action to identify supplemental information associated with an incident, an action to modify a configuration of at least one component of the IT environment, or a decision action.

5. The method of claim 1 further comprising determining a hierarchy of the suggested actions based at least on the input, and wherein causing display of the suggested actions comprises causing display of the suggested actions according to the hierarchy.

6. The method of claim 1 further comprising:
   identifying trends in action sequences for other course of actions;
   determining a hierarchy of the suggested actions based at least on the trends;
   wherein causing display of the suggested actions comprises causing display of the suggested actions according to the hierarchy.

7. The method of claim 1, further comprising:
   identifying trends in actions linked to the at least one of the plurality of actions; and
   wherein determining the suggested actions is further based on the trends.

8. The method of claim 1, further comprising:
identifying trends in actions linked to the at least one of the plurality of actions;
wherein determining the suggested actions is further based on the trends;
determining a hierarchy of the suggested actions based at least on the trends; and
wherein causing display of the suggested actions comprises causing display of the suggested actions according to the hierarchy.

9. The method of claim 1 further comprising:
receiving input selecting the particular action;
determining one or more services available to support the selection;
causing display of the one or more services; and
obtaining input indicative of a selection of at least one service from the one or more services.

10. The method of claim 1 further comprising:
receiving input selecting the particular action;
determining one or more services available to support the selection, wherein the one or more services comprise a database or a website;
causing display of the one or more services; and
obtaining input indicative of a selection of at least one service from the one or more services.

11. The method of claim 1, wherein an action of the plurality of actions is associated with an instruction set to implement the action in the IT environment.

12. The method of claim 1 further comprising:
determining component types associated with the IT environment; and
wherein determining the suggested actions is further based on the component types.

13. A non-transitory computer-readable storage medium storing instructions which, when executed by one or more processors, cause performance of operations comprising:
causing display of a first version of a course of action comprising a plurality of actions used to respond to occurrences of incidents in an information technology (IT) environment, wherein the IT environment comprises a plurality of computing devices and the course of action defines an operational flow of the plurality of actions;
obtaining input requesting addition of a new action in the course of action, wherein the new action is linked to at least one of the plurality of actions;
determining suggested actions based at least in part on the plurality of actions, wherein determining the suggested actions includes determining a relevance of each of the suggested actions to the plurality of actions of the course of action;
causing display of the suggested actions;
obtaining input selecting a particular action from the suggested actions; and
causing display of a second version of the course of action, wherein the second version of the course of action includes the plurality of actions of the first version of the course of action and the particular action.

14. The non-transitory computer-readable storage medium of claim 13, wherein the course of action comprises a flow diagram indicative of the operational flow of the plurality of actions.

15. The non-transitory computer-readable storage medium of claim 13, wherein obtaining the input requesting addition of the new action in the course of action comprises obtaining input requesting to link the new action to the at least one of the plurality of actions in the operational flow.

16. The non-transitory computer-readable storage medium of claim 13, wherein the plurality of actions include an action to identify supplemental information associated with an incident, an action to modify a configuration of at least one component of an information technology (IT) environment, or a decision action.

17. The non-transitory computer-readable storage medium of claim 13, wherein the instructions, when executed by the one or more processors, further cause performance of operations comprising a hierarchy of the suggested actions based at least on the input, and wherein causing display of the suggested actions comprises causing display of the suggested actions according to the hierarchy.

18. The non-transitory computer-readable storage medium of claim 13, wherein the instructions, when executed by the one or more processors, further cause performance of operations comprising:
identifying trends in actions linked to the at least one of the plurality of actions; and
wherein determining the suggested actions is further based on the trends.

19. The non-transitory computer-readable storage medium of claim 13, wherein the instructions, when executed by the one or more processors, further cause performance of operations comprising:
receiving input selecting the particular action;
determining one or more services available to support the selection;
cause display of the one or more services; and
obtain input indicative of a selection of at least one service from the one or more services.

20. The non-transitory computer-readable storage medium of claim 13, wherein an action of the plurality of actions is associated with an instruction set to implement the action in the IT environment.

21. The non-transitory computer-readable storage medium of claim 13, wherein the instructions, when executed by the one or more processors, further cause the performance of operations comprising determining component types associated with the IT environment, and wherein determining the suggested actions is further based on the component types.

22. An apparatus comprising:
one or more non-transitory computer readable storage media; and
program instructions stored on the one or more non-transitory computer readable storage media that, when read and executed by a processing system, direct the processing system to at least:
cause display of a first version of a course of action comprising a plurality of actions used to respond to incidents in an information technology (IT) environment, wherein the IT environment comprises a plurality of computing devices and the course of action defines an operational flow of the plurality of actions;
obtain input requestion addition of a new action in the course of action, wherein the new action is linked to at least one of the plurality of actions;
determine suggested actions based at least in part on the plurality of actions, wherein determining the suggested actions includes determining a relevance of each of the suggested actions to the plurality of actions of the course of action;
cause display of the suggested actions;
obtain input selecting a particular action from the suggested actions; and cause display of a second version of the course of action, wherein the second version of the course of action includes the plurality of actions of the first version of the course of action and the particular action.

23. The apparatus of claim 22, wherein the course of action comprises a flow diagram indicative of the operational flow of the plurality of actions, and wherein obtaining the input requesting addition of the new action in the course of action comprises obtaining input requesting to link the new action to the at least one of the plurality of actions in the operational flow.

24. The apparatus of claim 22, wherein the plurality of actions include an action to identify supplemental information associated with an incident, an action to modify a configuration of at least one component of the IT environment, or a decision action.

25. The apparatus of claim 22, wherein the program instructions further direct the processing system to determine a hierarchy of the suggested actions based at least on the input, and wherein causing display of the suggested actions comprises causing display of the suggested actions according to the hierarchy.

26. The apparatus of claim 22, wherein the program instructions further direct the processing system to:
  identify trends in actions linked to the at least one of the plurality of actions; and
  wherein determining the suggested actions is further based on the trends.

27. The apparatus of claim 22, wherein the program instructions further direct the processing system to:
  receive input selecting the particular action;
  determine one or more services available to support the selection;
  cause display of the one or more services; and
  obtain input indicative of a selection of at least one service from the one or more services.

28. The apparatus of claim 22, wherein an action of the plurality of actions is associated with an instruction set to implement the action in the IT environment.

29. The apparatus of claim 22, wherein the program instructions further direct the processing system to determine component types associated with the IT environment, and wherein determining the suggested actions is further based on the component types.

* * * * *